(12) United States Patent
Nakamura et al.

(10) Patent No.: US 9,096,728 B2
(45) Date of Patent: Aug. 4, 2015

(54) HEAT INSULATING MATERIAL

(71) Applicant: Toray Industries, Inc., Tokyo (JP)

(72) Inventors: Hirokado Nakamura, Shiga (JP); Kazuhiro Shino, Shiga (JP); Masahiro Kimura, Shiga (JP)

(73) Assignee: Toray Industries, Inc. (JP)

( * ) Notice: Subject to any disclaimer, the term of this patent is extended or adjusted under 35 U.S.C. 154(b) by 408 days.

(21) Appl. No.: 13/748,729

(22) Filed: Jan. 24, 2013

(65) Prior Publication Data

US 2014/0031445 A1    Jan. 30, 2014

Related U.S. Application Data

(62) Division of application No. 12/920,855, filed as application No. PCT/JP2009/054261 on Mar. 6, 2009, now abandoned.

(30) Foreign Application Priority Data

Mar. 7, 2008  (JP) ................................ 2008-057544
Mar. 7, 2008  (JP) ................................ 2008-057545
Aug. 1, 2008  (JP) ................................ 2008-199418

(51) Int. Cl.
| | |
|---|---|
| *C08J 9/12* | (2006.01) |
| *B29C 44/22* | (2006.01) |
| *B29C 44/50* | (2006.01) |
| *C08J 9/00* | (2006.01) |
| *B29C 44/34* | (2006.01) |
| *C08J 9/08* | (2006.01) |

(Continued)

(52) U.S. Cl.
CPC ............... *C08J 9/0061* (2013.01); *B29C 44/22* (2013.01); *B29C 44/348* (2013.01); *B29C 44/50* (2013.01); *C08J 9/08* (2013.01); *C08J 9/122* (2013.01);

(Continued)

(58) Field of Classification Search
CPC   B29C 44/22; B29C 44/3442; B29C 44/3446; B29C 44/3469; B29C 44/348; B29C 44/50; B29K 2105/04; B29K 2105/041; B29K 2105/046; C08J 9/0061; C08J 9/12; C08J 9/122; C08J 2201/03; C08J 2203/06; C08J 2203/08; C08J 2205/04; C08J 2205/042; C08J 2205/044; C08J 2205/048; C08J 2205/052; C08J 2367/04
USPC .......................... 521/134, 137, 138, 139, 140
See application file for complete search history.

(56) References Cited

U.S. PATENT DOCUMENTS

2002/0077378 A1*  6/2002  Chonde et al. .................. 521/82
2005/0084533 A1    4/2005  Howdle et al.

(Continued)

FOREIGN PATENT DOCUMENTS

EP   0 976 782 A1   2/2000
EP   1 095 970 A1   5/2001

(Continued)

*Primary Examiner* — Michael Tolin
(74) *Attorney, Agent, or Firm* — DLA Piper LLP (US)

(57) ABSTRACT

A method of manufacturing a resin foam includes dissolving a blowing agent into a mixture of a resin C and a resin D having a difference of solubility with respect to the blowing agent in an amount of more than 0% and less than 5%; subjecting the mixture to heat-melting for extrusion; and evaporating the blowing agent such that the resin foam has a porosity (X) of not less than 80%, a cell (L) with a cell diameter of not less than 1 μm and not more than 1000 μm, and a cell (S) with a cell diameter of not less than 0.01 μm and less than 1 μm, in which two peaks are present in cell diameter distribution, one peak thereof being present in not less than 10 μm and not more than 500 μm and the other peak being present in not less than 0.01 μm and less than 1 μm.

10 Claims, 6 Drawing Sheets

(51) Int. Cl.
  *E04B 1/76*  (2006.01)
  *E04B 1/74*  (2006.01)

(52) U.S. Cl.
  CPC ............... *E04B 1/76* (2013.01); *C08J 2201/03* (2013.01); *C08J 2203/06* (2013.01); *C08J 2205/042* (2013.01); *C08J 2205/048* (2013.01); *C08J 2367/04* (2013.01); *E04B 2001/742* (2013.01); *Y10T 428/249953* (2015.04); *Y10T 428/249991* (2015.04)

(56) References Cited

U.S. PATENT DOCUMENTS

2008/0081763 A1    4/2008  Swetlin et al.
2010/0025877 A1*   2/2010  Moreira et al. ................ 264/54

FOREIGN PATENT DOCUMENTS

| | | | |
|---|---|---|---|
| JP | 62-2093 A | | 1/1987 |
| JP | 08285175 A | * | 11/1996 |
| JP | 1024436 A | * | 1/1998 |
| JP | 1024476 A | * | 1/1998 |
| JP | 11201377 A | * | 7/1999 |
| JP | 2000290417 A | * | 10/2000 |
| JP | 2000320786 A | * | 11/2000 |
| JP | 2002069222 A | * | 3/2002 |
| JP | 2005271504 A | * | 10/2005 |
| JP | 2007153964 A | * | 6/2007 |
| JP | 2007332203 A | * | 12/2007 |
| JP | 2008231284 A | * | 10/2008 |
| WO | 00/01761 A1 | | 1/2000 |
| WO | WO2008/003623 A1 | * | 1/2008 |

\* cited by examiner

HEAT INSULATING MATERIAL

RELATED APPLICATIONS

This is a divisional application of U.S. application Ser. No. 12/920,855 filed Sep. 3, 2010, now abandoned, which is a §371 of International Application No. PCT/JP2009/054261, with an international filing date of Mar. 6, 2009 (WO 2009/110587 A1, published Sep. 11, 2009), which is based on Japanese Patent Application Nos. 2008-057544, filed Mar. 7, 2008, 2008-057545, filed Mar. 7, 2008, and 2008-199418, filed Aug. 1, 2008, the subject matter of which is incorporated by reference.

TECHNICAL FIELD

This disclosure relates to resin foams excellent in thermal insulation performance and environmental performance, and to non Freon thermal insulation foam materials capable of maintaining such thermal insulation properties for a long period of time.

BACKGROUND

Resin foams typified by a rigid urethane foam, a flexible urethane foam and expanded polystyrene are being used as heat insulating materials of houses and the like, and they play a very important role in reducing energies for cooling and heating under increasing energy conservation minds in recent years.

Such heat insulating materials exhibit excellent thermal insulation performance generally by containing low thermal conductivity gas in a very small volume inside a resin foam.

As the low thermal conductivity gas in heat insulating materials in past years, chlorofluorocarbons (CFC) were widely used, but because CFC are a substance destroying the ozone layer, in place of them, hydrofluorocarbons (HFC) and low molecular hydrocarbons such as butane and propane have been being used (JP 2007-332203 A and WO 00/01761 A1). However, since HFC have a very large Global Warming Potential, and the low molecular hydrocarbons are inflammable, there is arising a movement that carbon dioxide of lower environmental load and more safety is used.

However, since carbon dioxide is inferior in thermal insulation performance to HFC and low molecular hydrocarbons, to obtain thermal insulation properties of excellent thermal insulation performance, it is necessary to improve thermal insulation performance of foam itself.

In general, the thermal insulation performance of foam varies depending on porosity (X) and bubble diameter except for low thermal conductivity gas contained inside. The larger the porosity (X) and the smaller the bubble diameter, the higher the thermal insulation performance is exhibited. In the conventional art, to make porosity (X) large, the only measure was to make bubble diameter large, so there was a tendency that the thermal insulation performance became bad when more than a certain porosity (X).

Thus, in recent years, various studies have been done for controlling the bubble structure of foam. Particularly in JP 2007-153964 A, it is shown that various bubble diameters can be produced by using a styrene resin as a base and two kinds of blowing agents (water and carbon dioxide).

However, because the overall bubble size is large, no good thermal insulation performance can be obtained. Since water is used as a blowing agent, it will be a technique hardly applicable to polyester resins that hydrolysis is concerned.

It could therefore be helpful to provide a resin foam excellent in thermal insulation performance and environmental performance, further, to provide a non Freon thermal insulation foam material maintaining the excellent thermal insulation performance for a long period of time and not generating condensation easily.

SUMMARY

We thus provide:
(1) A resin foam where a porosity (X) is not less than 80%, having a cell (L) with a cell diameter of not less than 1 μm and not more than 1000 μm, and a cell (S) with a cell diameter of not less than 0.01 μm and less than 1 μm.
(2) The resin foam described in (1), wherein a number density of the cell (L) is not less than $10^2/mm^2$ and not more than $10^7/mm^2$, and a number density of the cell (S) is not less than $10^2\,\mu m^2$ and not more than $10^7\,\mu m^2$.
(3) The resin foam described in (1) or (2), wherein two peaks are present in the cell size distribution, one peak thereof is present in not less than 10 μm and not more than 500 μm, and the other peak is present in not less than 0.01 μm and less than 1 μm.
(4) The resin foam described in any one of (1) to (3), which includes a biodegradable polyester resin, and includes at least one kind of resin selected from the group consisting of a polyether-polylactic acid block copolymer, a polypropylene resin, a methacrylic resin, an acrylonitrile-butadiene-styrene resin, and a polyester resin different from the biodegradable polyester resin.
(5) A heat insulating material including the resin foam described in any one of (1) to (4), carbon dioxide gas and a resin film, wherein the resin film is not more than 15 [mL/($m^2$·day·atm)] (23° C., 0% RH) in carbon dioxide gas permeability, covering the resin foam and the carbon dioxide gas.
(6) The heat insulating material described in (5), wherein a concentration of the internal carbon dioxide gas covered by the resin film is not less than 50% by volume.
(7) The heat insulating material described in (5) or (6), wherein the carbon dioxide gas is derived from carbon dioxide of a blowing agent.
(8) The heat insulating material described in (7), wherein the carbon dioxide is carbon dioxide in a supercritical state.
(9) The heat insulating material described in any one of (5) to (8), wherein the resin film includes a biodegradable polyester resin.

The resin foam is excellent in thermal insulation performance and environmental performance. By using such a resin foam, it is possible to provide a non Freon thermal insulation foam material capable of maintaining the thermal insulation properties for a long period of time. This heat insulating material can be suitably used particularly as a non Freon thermal insulation foam material for building materials and home appliances.

DESCRIPTION OF NUMBERS AND SYMBOLS

1 Resin film
2 Mixture of adhesive substance and carbon dioxide generating material
3 Resin foam
10 Cell (S)
20 Cell (L)

DETAILED DESCRIPTION

Our heat insulating material includes a resin foam with a porosity (X) of not less than 80%, carbon dioxide gas, and a resin film having a specified carbon dioxide gas permeability, and has a structure that the resin film covers the resin foam and carbon dioxide gas. Each constitution of the heat insulating material is explained below.

Structure of Resin Foam

Regarding the resin foam used in a heat insulating material, it is important for the porosity (X) to be not less than 80%. When the porosity (X) of resin foam is less than 80%, heat transmission by a resin in the foam becomes large, thus it is not preferable because there tends to pose a problem on the point of thermal insulation properties or the like, when the resin foam is used in a heat insulating material. From the point of effectively suppressing heat transmission of the resin in the foam, the porosity (X) of resin foam is preferably not less than 90%, and more preferably not less than 93%. When the porosity (X) exceeds 99%, strength of resin foam lowers, handling becomes difficult, thus the porosity (X) is preferably not more than 99%.

Additionally, as the calculation method of porosity (X), for example, there are listed a method that a cross section of foam is observed with a microscope or the like, the bubble part and resin part are analyzed by an image analyzing apparatus or the like, for calculation, and a method of calculation from the specific gravity of resin before blowing and the specific gravity of foam after blowing.

As the bubble structure of resin foam, there are an open-cell structure that babbles are brought together, and a closed-cell structure that babbles are independent, but in the case of aiming at higher thermal insulation performance, a resin foam having closed-cells is preferable.

Figure 1:
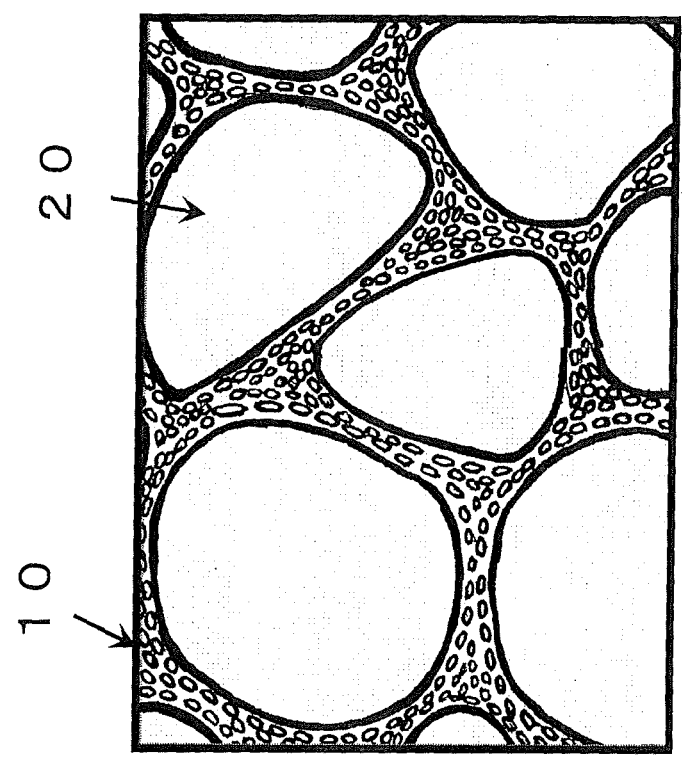
FIG. 1 is a schematic view of the cross section of a resin foam.

Regarding the resin foam used in a heat insulating material, when its cross section is observed with a microscope or the like, for example, as shown in FIG. 1, it has a large cell (L) with a cell diameter of not less than 1 µm and not more than 1000 µm, and a small cell (S) with a cell diameter of not less than 0.01 µM and less than 1 µm. Since cell (L) of a large cell diameter and cell (S) of a small cell diameter are coexistent, the resin foam can achieve the porosity as described above, and also enhance thermal insulation performance.

When the cell diameter of cell (L) exceeds 1000 µm, there arises sometimes a problem that heat transmission due to convection and radiation of gas present in a cell becomes large. To effectively suppress heat transmission of gas in a cell, it is preferable to have a cell of not less than 10 µm and not more than 500 µm, above all, it is preferable to have a cell of not less than 10 µm and not more than 100 µm.

A high porosity (X) is achieved by a cell (L) of large cell diameter, and a minute cell (S) of submicron or nano-order is present in the wall surface of the cell (L), thereby it becomes possible to greatly reduce heat transmission of the resin of wall surface. The smaller the cell (S), the cell can be present in the thinner wall surface, thus the cell (S) is preferably less than 1 µm. When the cell (S) is less than 0.01 µm, there is a case that it becomes difficult to achieve to a high porosity (X). Therefore, as the cell (S), it is preferable to have a cell with a cell diameter of not less than 0.01 µm and less than 1 µm. Further, it is preferable to have a cell with a cell diameter of not less than 0.05 µm and less than 1 µm, above all, it is preferable to have a cell with a cell diameter of not less than 0.10 µm and less than 1 µm.

Additionally, a cell diameter means an equivalent diameter circle, and the equivalent diameter circle means a diameter of a circle having the same area as the area of a cell.

In the resin foam, it is preferable that a number density of cell (L) is not less than $10^2/mm^2$ and not more than $10^7/mm^2$, and a number density of cell (S) is not less than $10^2/\mu m^2$ and not more than $10^7/\mu m^2$. By doing so, it becomes possible to form a minute cell (S) around the cell (L), it is possible to more heighten the porosity, and it becomes possible to greatly reduce heat transmission of resin. It is more preferable that a number density of cell (L) is not less than $10^3/mm^2$ and not more than $10^7/mm^2$, and a number density of cell (S) is not less than $10^3/\mu m^2$ and not more than $10^7/\mu m^2$. It is preferable that the cell (L) and cell (S) are uniformly scattered in the resin foam.

As the resin foam, in the cell size distribution that is measured as explained in the section of Example, a Bimodal distribution is preferable. Ordinarily, the cell diameters of resin foam are not all the same cell diameter, but present with a distribution in a certain range. The Bimodal distribution represents "a bimodal distribution of split-peak type" where the distribution is present as two independent distributions, or "a bimodal distribution of shoulder-peak type" where two distributions are overlapped appearing two peaks. A preferable distribution of the cell (L) and cell (S) is so-called "a bimodal distribution of split-peak type," the preferable peaks are in a range of not less than 10 µm and not more than 500 µm as the cell (L), and in a range of not less than 0.01 µm and less than 1 µm as the cell (S).

Production Method of Resin Foam

The production method of the resin foam as described above is not particularly restricted, and there can be listed a method that in a finely dispersed mixture of a resin C with a resin D having a difference of solubility of a blowing agent in a range of more than 0% and less than 5%, the blowing agent is impregnated for blowing (hereinafter called "method 1"), a method that in a finely dispersed mixture of a resin A with a resin B having a difference of solubility of a blowing agent in a range of not less than 5%, the blowing agent is impregnated for blowing, then, the resin B is decomposed (hereinafter called "method 2"), and the like.

First, "method 1" of the former is explained. This method is a method that cell (L) and cell (S) are produced by the solubility difference between island components and sea components uniformly dispersed in nano-order (specifically, more than 0% and less than 5%).

The resin C and resin D used in the production method of this resin foam are not particularly restricted, and there are listed a polyurethane resin, polystyrene resin, polypropylene resin, polylactic acid resin, polyester resin, polyethylene resin, methacrylic resin, polycarbonate resin, acrylonitrile-butadiene-styrene resin, and the like. Particularly, in the case of giving greater importance to environmental performance, a polylactic acid resin as resin C, and the above-described other resin as resin D are preferably used.

The polylactic acid resin indicates a polylactic acid resin obtained by ring-opening polymerization of lactide or direct polymerization of lactic acid, and a polylactic acid copolymer obtained by ring-opening polymerization of lactide. In particular, a mixture of a polylactic acid copolymer that lactide was subjected to ring-opening polymerization with polyol and a polylactic acid resin is suitably used as a combination of the above-described resin C and resin D, and when it is a finely dispersed mixture where a distributed domain of polyol is less than 1 µm, it is more preferable as a combination of the resin C and resin D.

Additionally, being finely dispersed indicates that the sea component composed of the resin dispersed is less than 1 µm in diameter. As a means for finely dispersing resin C and resin D, there are listed a method that resin C and resin D are block-copolymerized, and the block copolymer is used as resin C and resin D, and a method that a block copolymer composed of resin C and resin D is added to resin C and resin D to improve compatibility between resin C and resin D. By changing the molecular weight and copolymerization ratio of a block copolymer used in the above method, the effect can be more efficiently exhibited. Particularly in a block copolymer, by increasing the copolymerization ratio of sea components, the sea components tend to be fixed in space, so the localization of sea components can be suppressed, and a more minute and uniform dispersion state is easily produced.

From such a point, as the resin particularly preferably used in "method 1," it is preferable to combine a polylactic acid resin as resin C, and as resin D, with one kind of resin selected from a polylactic acid block copolymer, polypropylene resin, polylactic acid resin different from resin C, methacrylic resin and acrylonitrile-butadiene-styrene resin.

As the above-described polylactic acid block copolymer, as long as it has a polylactic acid segment, other component is not particularly limited, but a polyether-polylactic acid copolymer is preferably used. As the polyether component of the polyether-polylactic acid copolymer, an alkylene ether such as polyethylene glycol is suitably used, but it is not particularly limited. As a specific example of the polyether-polylactic acid copolymer, an ABA type block copolymer obtained by ring-opening polymerization of lactide with polyethylene glycol is listed. It is preferable that the molecular weight of polyethylene glycol is 2000 to 10000, and the molecular weight of copolymerized polylactic acid segment is 2000 to 3500.

Subsequently, "method 2" is explained. In this method, after cell (L) is produced by resin A with high solubility of a blowing agent, resin B with low solubility of a blowing agent is decomposed, thereby to produce cell (S).

The resin A used for blowing is not particularly restricted, the same resin as in the foregoing "method 1" (resin C and resin D) can be listed. Namely, as the resin A, there are listed a polyurethane resin, polystyrene resin, polypropylene resin, polyester resin, polylactic acid resin, polyethylene resin, methacrylic resin, polycarbonate resin, acrylonitrile-butadiene-styrene resin, and the like.

On the other hand, as the resin (B), there are listed a polyester resin, methacrylic resin, or hydroxycarboxylic acids typified by polylactic acid resin and a biodegradable resin mainly consisting of aliphatic polyesters. Particularly in the case of giving greater importance to environment, a biodegradable resin is preferable.

Blowing in the "method 1" and "method 2" is not particularly restricted, for example, it is conducted by the following method. Namely, there are an extrusion blowing process that a resin is supplied to an extruder or the like, equipped with an injection apparatus of a blowing agent, heated to melt, after a blowing agent is injected or added according to need, extruded into air through a slit die, or into a mold, the blowing agent is evaporated from the resin by a rapid pressure release at that time to produce foam; a batch foaming process that after a resin is once processed in a bead or sheet, the resin is charged together with a blowing agent into a pressure-resistant container such as autoclave, the blowing agent is impregnated in the resin at a predetermined temperature, pressure and time, foam is produced by a rapid pressure release or reheating after the impregnated resin is cooled, and the like. By these processes, cell (L) and cell (S) are produced by "method 1," and cell (L) is produced by "method 2."

In the case of "method 2," subsequently, decomposition of resin (B) is conducted. As the decomposition of resin (B), photolysis, hydrolysis, thermal decomposition, decomposition with acid or alkali, decomposition by ultraviolet radiation, biodegradation by microbe or the like are listed and, according to a resin to be decomposed, various methods can be used. For example, when a resin to be decomposed is polymethylmethacrylate, it can be decomposed by irradiating violet light to a resin foam, and when polylactic acid, it can be decomposed by hydrolysis or biodegradation by microbe.

As a specific production example of resin foam by "method 2," there are listed a method that after polylactic acid and polymethylmethacrylate are mixed and blown to produce cell (L), the polymethylmethacrylate is decomposed with a solvent dissolving only polymethylmethacrylate (toluene-hexane solution, or the like) to produce cell (S) around the cell (L), and a method that after polystyrene and polylactic acid are mixed and blown to produce cell (L), cell (S) is produced around the cell (L) by hydrolyzing only polylactic acid.

As the blowing agent used in "method 1" and "method 2," a chemical blowing agent that generates various gases by thermal decomposition, or a physical blowing agent using various gases themselves is listed. In extrusion blowing, both chemical blowing agent and physical blowing agent can be suitably used, and in a batch foaming process, using a physical blowing agent is preferable.

As the chemical blowing agent, mainly there are listed oxybis(benzenesulfonyl hydrazide) (OBSH), azodicarboxamide (ADCA), dinitroso-pentamethylene tetramine (DPT), sodium hydrogen carbonate, sodium carbonate, ammonium carbonate, potassium hydrogen carbonate, potassium carbonate, calcium hydrogen carbonate, calcium carbonate, magnesium carbonate and the like, among these, they can be used in one kind or a mixture of two kinds or more. In particular, sodium hydrogen carbonate is suitably used. For the purpose of accelerating the generation of carbon dioxide gas, an acidic agent such as potassium hydrogen tartrate, calcium primary phosphate, fumaric acid and sodium phosphate can be concomitant use with a carbon dioxide generating material.

As the physical blowing agent, butane, propane, nitrogen, carbon dioxide gas and the like are suitably used. However, since butane and propane are inflammable, in the case of giving greater importance to safety and environmental performance, nitrogen and carbon dioxide gas are preferable, and more suitably, carbon dioxide gas is used. As the physical blowing agent, carbon dioxide can be used in a supercritical state or gas state. In the case of extrusion blowing process for producing a resin foam, the inside of an extruder becomes a high temperature and high pressure state, thus it is preferably used in a supercritical state where diffusion is fast and density is large, and in the case of batch foaming, both the supercritical state and gas state can be suitably used.

In the resin foam, a lubricant to provide stable performance of extrusion and a particle such as a foam nucleating agent can be added in a range not damaging the effect. Specifically there are listed talc, silica, calcium silicate, wollastonite, kaolin, clay, mica, zinc oxide, titanium oxide, calcium carbonate montmorillonite, zeolite, sodium stearate, magnesium stearate, barium stearate, fluid paraffin, olefin type wax, erucic acid amide and the like.

For the purpose of reflecting radiation heat or heat ray (far-infrared ray) of sun light, or for the purpose of shielding a resin foam from external air, it is also preferable to form a layer of metal or metal oxide over a part of resin foam or the whole surface.

As such metal, it is not particularly limited, aluminum, indium, zinc, gold, silver, platinum, nickel, chromium and the like are listed, and as the metal oxide, oxides of titanium, zirconium, silicon, magnesium or the like are listed. In particular, aluminum and indium with a high reflection effect of heat ray (far-infrared ray) are preferable, above all, aluminum with low gas permeability being widely used is most preferably used.

As the method for forming a layer of metal or metal oxide on the surface of resin foam, a method of depositing metal or metal oxide directly on the foam and the like are listed. Constitution of resin film having specified carbon dioxide gas permeability, and production method thereof.

Regarding the resin film used in a heat insulating material, of importance is that it is a resin film having specified carbon dioxide gas permeability, specifically, it is a resin film of not more than 15 $[mL/(m^2 \cdot day \cdot atm)]$ in carbon dioxide gas permeability at 23° C. and 0% RH. When the carbon dioxide gas permeability at 23° C. and 0% RH is more than 15 $[mL/(m^2 \cdot day \cdot atm)]$, the lowering of thermal insulation performance due to gas dissipation of carbon dioxide gas is large, and it becomes difficult to maintain sufficient stable performance of insulation property particularly as building material applications.

The resin film is preferably not more than 5.0 $[g/(m^2 \cdot day)]$ in water vapor permeability at 40° C. and 90% RH. When the water vapor permeability at 40° C. and 90% RH is more than 5.0 $[g/(m^2 \cdot day)]$, thermal insulation performance lowers due to invasion of humidity inside the foam, and it becomes difficult to maintain sufficient stable performance of insulation property. Being dependent on use applications, there is a possibility that a trouble due to condensation takes place.

In the case of maintaining the thermal insulation performance for a longer period of time, it is preferable that the carbon dioxide gas permeability is preferably not more than 10 $[mL/(m^2 \cdot day \cdot atm)]$, and the water vapor permeability is 0.8 $[g/(m^2 \cdot day)]$. On the other hand, the less the carbon dioxide gas permeability and the water vapor permeability are, the better, but as the lower limit, it is thought that the carbon dioxide gas permeability is about 0.01 $[mL/(m^2 \cdot day \cdot atm)]$, and the water vapor permeability is about 0.01 $[g/(m^2 \cdot day)]$.

Additionally, the carbon dioxide gas permeability is measured on the basis of a gas chromatographic method described in JIS K7126-2 (2006), and the water vapor permeability is measured on the basis of an infrared censor method described in JIS K7129 (2008).

Hereinafter, a resin film of not more than 15 $[mL/(m^2 \cdot day \cdot atm)]$ in carbon dioxide gas permeability is called a carbon dioxide gas barrier film, and a resin film of not more than 15 $[mL/(m^2 \cdot day \cdot atm)]$ in carbon dioxide gas permeability and of not more than 5.0 $[g/(m^2 \cdot day)]$ in water vapor permeability is called a carbon dioxide gas/water vapor barrier film.

As the method for producing a carbon dioxide gas barrier film, there are listed a method that a film is made of a resin with a high carbon dioxide gas barrier property (hereinafter called "method A"), a method that a vapor metalized layer is provided on a film made of common resin to obtain a vapor metalized film (hereinafter called "method B"), and the like.

The above-described "method A" is explained.

As the resin with a high carbon dioxide gas barrier property, a resin that interaction between polymer main chains is strong and free volume is small, such as polyvinyl alcohol, polyvinylidene chloride and polyglycol acid, is preferably used. Above all, from industrialization and easiness in processing and availability, an ethylene-vinyl alcohol resin is preferably used.

As long as it is a film that the foregoing resin is used, any film-forming method exhibits a high carbon dioxide gas barrier property, and when a film obtained by a resin with a high carbon dioxide gas barrier property is drawn and orientated in one direction or two perpendicular directions to be an oriented film, barrier properties of carbon dioxide gas and water vapor are further improved. This is because when drawn and orientated, resulting from increase in regularity of polymer main chains themselves, interaction is strengthened and free volume becomes small.

As the method for drawing and orientation, there are listed a sequential biaxial orientation that after drawing in one direction by passing through rolls provided with speed difference, both ends of film are held at grips on a rail expanding toward the width direction, and drawing is done in the width direction of film, and a simultaneous biaxial orientation that a film is drawn simultaneously in the longitudinal direction and the width direction by internal pressure of film blown up in a tubular shape.

The layer constitution of a resin film in "method A" is not particularly restricted as long as there is at least one layer made of a resin with a high carbon dioxide gas barrier property. However, to further improve the carbon dioxide gas barrier property, it is preferable to laminate a vapor metalized layer on a resin film with a high carbon dioxide gas barrier property being made of the foregoing resin.

Next, "method B" is explained.

As a common resin, there can be used a polystyrene resin, polyethylene resin, polypropylene resin, polylactic acid resin, an aliphatic polyester resin such as polybutylene succinate, an aromatic polyester resin such as polyethylene terephthalate, a methacrylic resin, polycarbonate resin, polyamide resin, and the like. In particular, in the case of aiming at a barrier film of low environmental load, there are listed a polylactic acid resin, an aliphatic polyester resin composed of aliphatic dicarboxylic acid and aliphatic diol, or a polyester resin composed of hydroxydicarboxylic acid is preferably used. Specifically, polybutylene adipate, polybutylene succinate, a polybutylene adipate/succinate copolymer, polyhydroxylactic acid, polycaprolactone, polylactic acid, polyglycol and the like. There can be suitably used a copolymer of aliphatic polyester and aromatic polyester, such as poly(butylene succinate-terephthalate) and poly(butylene adipate-terephthalate), and a copolymer of aromatic polyesters such as poly(butylene terephthalate-ethylene terephthalate) as well. In the case of aiming at a heat insulating material of Carbon Neutral, a resin derived from biological resources (bioplastic) is preferably used, and in the case of giving greater importance to costs and easiness in processing and availability, polystyrene, polyethylene, polypropylene, polylactic acid and polyethylene terephthalate are preferably used.

The film-forming method of a common resin film is not particularly restricted, there are listed a melt film-forming process that a resin melted by an extruder is casted on a mirror-surface drum to form a film, and a solution film-forming process that a resin is dissolved with a solvent, the solution is flown in planar shape, and then the solvent is evaporated to form a film. Above all, a melt film-forming process is preferable from the points of costs and less environmental influence due to solvent. In the same way as the "method A," it is preferable that a common resin film obtained is drawn and orientated in one direction or two perpendicular directions.

The layer constitution of a common resin film itself in "method B" may be a single layer or lamination layer, and is not particularly restricted as long as it is a film composed of the above-described common resin. However, because a common resin film alone cannot satisfy the carbon dioxide gas barrier property sufficiently, it is preferable to laminate a vapor deposition film of metal or metal oxide on at least one surface of film to be a vapor metalized layer film. By doing so, the carbon dioxide gas barrier property is improved.

Although even one layer of the vapor metalized layer has a sufficient carbon dioxide gas barrier property, in the case of obtaining a higher carbon dioxide gas barrier property, or aiming at preventing the lowering of local barrier property due to pinhole, two or more layers of the vapor metalized layer can be laminated. The more the vapor metalized layers are laminated, it is preferable because the carbon dioxide gas barrier property is improved, but which leads to an increase in cost and the lowering of productivity, thus the lamination layer is preferably not more than 10 layers.

To produce a carbon dioxide gas/water vapor barrier film by setting the water vapor permeability in a carbon dioxide gas barrier film to not more than 5.0 [$g/(m^2 \cdot day)$] or less, it is preferable to laminate a polyolefin resin film on a carbon dioxide gas barrier film produced by "method A" or "method B."

Specifically, it may be enough to be a film that a layer composed of a resin where interaction between polymer main chains is strong and free volume is small such as polyvinyl alcohol, polyvinylidene chloride and polyglycol, and on at least one surface thereof, a layer of polyolefin resin such as polypropylene and polyethylene is laminated. A polyolefin resin is generally excellent in water vapor barrier property, thus by laminating it on a carbon dioxide gas barrier film, a film with excellent barrier properties for both carbon dioxide gas and water vapor can be obtained.

As a specific film-forming method of such a carbon dioxide gas/water vapor barrier film, there are listed a method that while each of resins is melted using two or more extruders, the resins are flown together so as to be a laminated structure, then, casted on a mirror-surface drum, and a method that the carbon dioxide gas barrier film and a polyolefin resin film separately film-formed are bonded with a binding agent or the like in a separate process.

The laminated constitution in the carbon dioxide gas/water vapor barrier film is not particularly restricted. However, for enhancing a water vapor barrier property, as described above, it is preferable to provide a vapor deposition layer of metal or metal oxide.

Hereinafter, a vapor deposition layer in a carbon dioxide gas barrier film or a carbon dioxide gas/water vapor barrier film is detailed.

As the metal used in the vapor deposition layer, there are listed aluminum, indium, zinc, gold, silver, platinum, nickel, chromium and the like. As the metal oxide used in the vapor deposition layer, there are listed an oxide of titanium, zirconium, silicon, magnesium and the like. Among these, aluminum with low permeation properties of carbon dioxide gas and water vapor being widely used is suitably used. By forming the vapor deposition layer on a resin film, barrier properties of carbon dioxide gas and water vapor are improved, and this is suitably used as a carbon dioxide gas barrier film or a carbon dioxide gas/water vapor barrier film.

As the vapor deposition method of metal or metal oxide, it is possible to use a physical vapor deposition technique such as vacuum evaporation, Electron Beam evaporation, sputtering and ion-plating, and a chemical vapor deposition technique such as plasma-enhanced Chemical Vapor Deposition, and from the viewpoint of productivity, vacuum evaporation is particularly preferably used.

In laminating a vacuum deposition layer, for improving adhesion of vacuum deposition layer, it is preferable to previously conduct pretreatment such as corona discharge treatment on the surface to be deposited of a resin film as a base material.

Additionally, in the case that the desired carbon dioxide gas barrier property and water vapor barrier property are not obtained even by the above, a plurality of vapor deposition films with the same constitution or different constitution may be stuck. When the purpose is to prevent gas leak from the foam when used in a heat insulating material, it is preferable to stick two pieces or more.

In forming a vapor deposition layer, it is also preferable to coat a primer on a film as a base material previously in line or off line. Providing a coated layer of primer is preferable because a vapor deposition layer of high adhesion is obtained, which is effective for improving barrier properties of carbon dioxide gas and water vapor.

Further, in a resin film, a particle such as lubricant and foam nucleating agent can be added in a range not damaging the effect. Specifically there are listed talc, silica, calcium silicate, vvollastonite, kaolin, clay, mica, zinc oxide, titanium oxide, calcium carbonate montmorillonite, zeolite, sodium stearate, magnesium stearate, barium stearate, fluid paraffin, olefin type wax, erucic acid amide and the like.

Carbon Dioxide Gas

In the heat insulating material, including carbon dioxide gas is important.

As long as carbon dioxide gas is included in the heat insulating material, origin (origination) of the carbon dioxide gas is not particularly restricted, for example, there are listed (1) carbon dioxide gas derived from carbon dioxide in a supercritical state of a blowing agent, (2) carbon dioxide gas derived from biodegradable resin and microbe, (3) a carbon dioxide generating material is contained in a heat insulating material, carbon dioxide gas derived from the carbon dioxide generating material, and the like.

In regard to (1), in producing a resin foam that is used in a heat insulating material, a resin foam is produced using carbon dioxide in a supercritical state as a blowing agent, the resin foam containing the carbon dioxide is wrapped with the above-described resin film such as a carbon dioxide gas/water vapor barrier film to produce a heat insulating material, thereby carbon dioxide gas can be included in the heat insulating material.

In regard to (2), for producing a heat insulating material, in wrapping a resin foam using the above-described resin film such as a carbon dioxide gas/water vapor barrier film, by covering a biodegradable resin and microbes as a carbon dioxide generating material at the same time, carbon dioxide gas can be included in the heat insulating material. Regarding the biodegradable resin as one of the carbon dioxide generating material, a biodegradable resin typified by polycaprolactone, polybutylene succinate, polyethylene succinate and the like is listed. By conducting biodegradation using these resins and microbes, carbon dioxide gas can be generated. In this regard, when a molecular weight of biodegradable resin is several ten thousands or more, since there is a case that biodegradation is difficult to occur, the molecular weight of biodegradable resin is 50000 or less in number-average molecular weight, and preferably 10000 or less. The lower limit of the number-average molecular weight is about 1000.

In regard to (3), for producing a heat insulating material, in wrapping a resin foam using the resin film such as a carbon dioxide gas/water vapor barrier film, by covering a carbon dioxide generating material with the resin film at the same time, carbon dioxide gas generating from the carbon dioxide generating material can be included in a heat insulating material. As the carbon dioxide generating material, there is listed at least one kind selected from the group consisting of sodium hydrogen carbonate, sodium carbonate, ammonium carbonate, potassium hydrogen carbonate, potassium carbonate, calcium hydrogen carbonate, calcium carbonate and magnesium carbonate, and carbon dioxide gas derived from these can be used.

Heat Insulating Material

The heat insulating material includes the resin foam, carbon dioxide gas and resin film as described above, and constitution that the resin foam and carbon dioxide gas are wrapped with the resin film is preferable. Further, the inside covered with the resin film can include a carbon dioxide generating material. Covering indicates that a resin foam and carbon dioxide gas are closely sealed with a resin film, and its method is arbitral.

Figure 2:
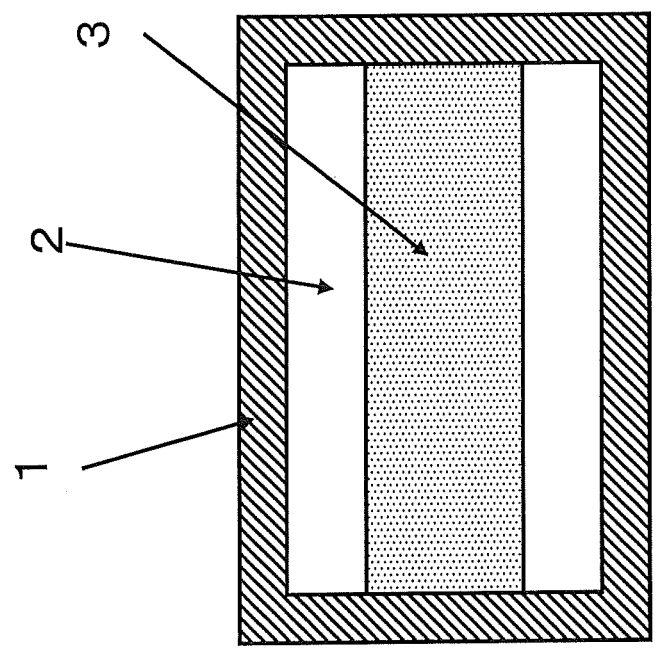
FIG. 2 is a schematic view of the cross section of a heat insulating material.
Figure 3:
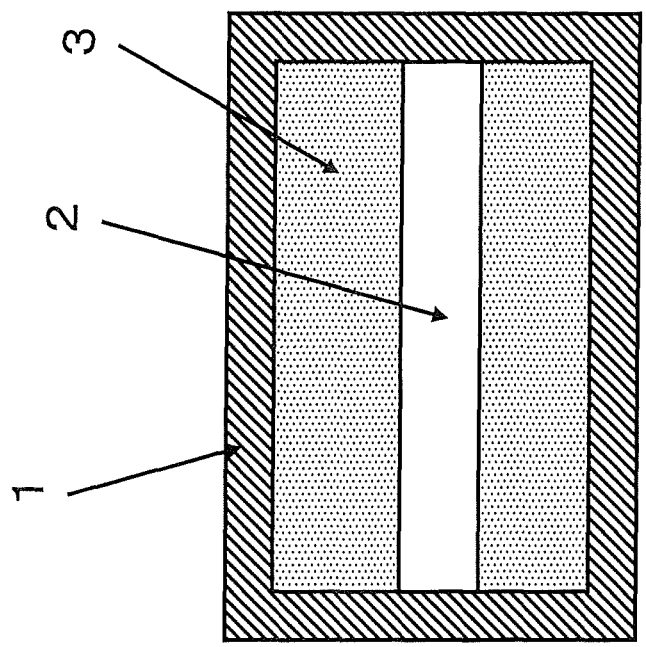
FIG. 3 is a schematic view of the cross section of another heat insulating material.

The heat insulating material is specifically shown in FIG. 2 and FIG. 3. FIG. 2 is the cross sectional view of a heat insulating material. As a method for producing the heat insulating material of FIG. 2, for example, there is listed a method that a mixture of an adhesive substance and a carbon dioxide generating material is coated on the surface of a resin film such as carbon dioxide gas/water vapor barrier film (in the case of using a carbon dioxide gas/water vapor barrier film having a vapor deposition layer, resin surface of the carbon dioxide gas/water vapor barrier film) (hereinafter, in a carbon dioxide gas/water vapor barrier film having a vapor deposition layer on one surface, a surface not having a vapor deposition layer is called a resin surface), thereby to stick a resin foam. There is also listed a method that a mixture of a low melting point polymer and a carbon dioxide generating material is coated on the surface of a resin film such as carbon dioxide gas/water vapor barrier film (in the case of using a carbon dioxide gas/water vapor barrier film having a vapor deposition layer, resin surface of the carbon dioxide gas/water vapor barrier film), thereby to conduct thermal adhesion to a resin foam.

As the specific example, there is listed a method that after polylactic acid of 20000 in number-average molecular weight is dissolved in tetrahydrofuran (THF), the solution is uniformly coated on a resin surface and heated by a hot-air dryer to sufficiently evaporate the solvent, subsequently, an adhesive layer that microbes and starch were mixed is over-coated on the coated surface of polylactic acid, stuck to a resin foam, and ends of carbon dioxide gas/water vapor barrier film or the like are subjected to thermal adhesion. There is also listed a method that an adhesive mixture of starch and sodium hydrogen carbonate is produced, then, coated on the resin surface of carbon dioxide gas/water vapor barrier film or the like having a vapor deposition layer, this is subjected to thermal adhesion to a resin foam that was extrusion-blown. However, it is not limited thereto.

FIG. 3 is the cross sectional view of a heat insulating material. As a method for producing the heat insulating material of FIG. 3, for example, there is listed a method that after producing two sets of constituted bodies where the resin surface of a resin film such as carbon dioxide gas/water vapor barrier film and one surface of resin foam are melt-bonded, in one set of the two sets of constituted bodies, on the surface opposite to the side that the film was melt-bonded (hereinafter, resin foam surface), an adhesive layer that emulsion of biodegradable resin, microbes and starch were mixed is coated overall or partly, and stuck to the resin foam surface of the other set. Alternatively, there is listed a method that after injecting a mixed liquid of emulsion of biodegradable resin and microbes into the inside of a resin foam with a syringe, the resin foam and a resin film such as carbon dioxide gas/water vapor barrier film are melt-bonded. However, it is not limited thereto.

Additionally, other than the materials shown in FIG. 2 and FIG. 3, there is listed a constitution that a resin foam and a carbon dioxide generating material are covered with a resin film using a method that after a resin film such as carbon dioxide gas/water vapor barrier film is processed in a bag, in which a resin foam and a carbon dioxide generating material are put, and opening is sealed by melt-bonding, or with a sticker or an adhesive.

There is also listed a method that even without containing a carbon dioxide generating material, the whole surface of a resin foam containing carbon dioxide gas being blown with carbon dioxide gas is covered with a resin film such as a carbon dioxide gas/water vapor barrier film (in the case of carbon dioxide gas barrier film having a vapor deposition layer, for the resin surface so as to be opposite to a resin foam), and a resin film run off from the four corners of the resin foam is subjected to thermal adhesion with an impulse sealer.

To maintain thermal insulation performance for a long period of time, it is preferable to contain 50 volume % or more in concentration of internal carbon dioxide gas covered when the concentration of internal gases covered is 100 volume %. It is more preferably 70 volume % or more, and further preferably 80 volume % or more.

Regarding the heat insulating material produced by the above-described method, since the resin foam is covered with a resin film such as a carbon dioxide gas/water vapor barrier film, the lowering of thermal insulation properties due to gas dissipation of carbon dioxide gas from the resin foam hardly takes place. In addition, in the case that a carbon dioxide generating material is present inside, because carbon dioxide gas is generated from the carbon dioxide generating material, it is possible to maintain thermal insulation performance for a long period of time.

Specifically, it is preferable for the heat insulating material to be not more than 30 (mW/mK) in thermal conductivity right after producing a heat insulating material, and further preferably not more than 25 (mW/mK). Additionally, the less the thermal conductivity is, the more preferable, but the lower limit practically achievable is thought to be about 10 (mW/mK).

From the viewpoint of long-use (durability), the value of thermal conductivity after storage under high humidity or under high vacuum for a long period of time is also important. Specifically, the thermal conductivity of heat insulating material after storage for 250 hours under an environment at a temperature of 60° C. and a humidity of 85% RH (under high humidity environment) is preferably not more than 30 (mW/mK), and further preferably not more than 25 (mW/mK).

Further, the thermal conductivity of heat insulating material after storage for 1000 hours under an environment at a temperature of 40° C., a humidity of 0% RH and a vacuum of 300 Torr is preferably not more than 35 (mW/mK), and further preferably 30 (mW/mK).

It becomes possible to exhibit the thermal conductivity described above.

In such a heat insulating material, water vapor from the outside of heat insulating material is difficult to permeate. Therefore, when used in houses and the like, it is suitable as a heat insulating material not generating condensation easily Lastly, the heat transfer mechanism of resin foam commonly thought is written below, and the principle is inferred:

$\lambda f$ (thermal conductivity of foam)=$\lambda g$ (thermal conductivity of gas in foam cell)+$\lambda s$ (thermal conductivity of resin in foam)+$\lambda c$ (convective heat transfer of gas in foam cell)+$\lambda r$ (radiant heat transfer in foam cell)  (Formula 1).

In the above formula, kg and ks are terms related to the porosity (X) of foam, $\lambda c$ and $\lambda r$ are terms related to cell diameter. Specifically, when the porosity (X) of foam increases, contribution of $\lambda g$ becomes large, and when the porosity (X) of foam decreases, contribution of $\lambda s$ becomes large. When cell diameter becomes large, contribution of $\lambda c$ and $\lambda r$ becomes large, and when cell diameter becomes small, contribution of $\lambda c$ and $\lambda r$ becomes small.

Herein, the resin foam used in a heat insulating material has a large cell (L) with a cell diameter of not less than 1 μm and not more than 1000 μm, and a small cell (S) with a cell diameter of not less than 0.01 μm and less than 1 μm. In general, when a cell with the cell diameter of not more than 1000 heat transfer of $\lambda c$ and $\lambda r$ becomes negligible small, resulting from that a cell is generated on the resin wall surface foamed by cell (S), $\lambda s$ becomes small. As a result, it is thought to obtain a resin foam having high thermal insulation properties (low thermal conductivity).

EXAMPLES (1) Porosity (X)
  a) Using a scanning electron microscope (FE-SEM) manufactured by JEOL Ltd., a cross section of resin foam was enlarged to a range for the measuring image region of one side to be 500 μm, and an image was scanned.
  b) A transparent sheet (OHP sheet) was placed on a photograph, and the part of cell was marked out thereon with black ink,
  c) The image treated in b) by an image treating apparatus (manufactured by Pierce Company, part number: PIAS-II) was scanned, the dark color part and pale color part (whether marked with black ink or not) were distinguished, using "FRACTAREA" (area ratio) in the image analytical calculation function, the area of dark color part, that is, the area of cell (Va) was obtained, and porosity (X) was obtained by the following formula:

Porosity (X) %=[area of whole image−area (Va)]/area of whole image×100.

d) The number of measuring samples was set to 5 (n=5), the average of 5 times was defined as porosity (X).

(2) Porosity (X2)
It was calculated from specific gravity of resin before blowing (Gp) and specific gravity of resin foam (GO using the following formula. Measurement of specific gravity was measured by an electronic hydrometer "SD-120L" available from Mirage Trading Company. The average of 5 samples was used as specific gravity of resin foam (Gf).
Measuring Condition
  Sample size: 3 cm square×1 cm thickness
  Measuring water temperature: 23° C. (pure water was used)
  Number of measuring samples: 5 (=n number)
Calculating Formula Porosity (X2)=(1−Gf/Gp)×100 [%]

(3) Confirmation Method of Presence or Absence of Cell (L) and Cell (S), and Number Density Using a scanning electron microscope (FE-SEM) manufactured by JEOL Ltd., an image of the cross section in the thickness direction of resin foam being enlarged by 100 times was scanned. Presence or absence of cell (L) was confirmed from the image. The number of bubbles of cell (L) was measured from the image scanned. In this regard, when part of a bubble was run off from screen, the bubble was not counted as the number of bubbles. The number of bubbles measured was converted into the number of bubbles per unit area (1 mm$^2$) thereby to calculate a number density. This measurement was carried out randomly at 100 places, and the average was defined as the number density of cell (L).

Next, an image in the vicinity of cell (L) being enlarged by 20000 times was scanned. Presence or absence of cell (S) was confirmed from the image. The number of bubbles of cell (S) was measured from the image scanned. In this regard, when part of a bubble was run off from screen, the bubble was not counted as the number of bubbles. The number of bubbles measured was converted into the number of bubbles per unit area (1 μm$^2$) thereby to calculate a number density. This measurement was carried out randomly at 100 places, and the average was defined as the number density of cell (S).

Additionally, the presence or absence of cell (L) was determined by presence or absence of a cell of not less than 1 μm and not more than 1000 μm in equivalent diameter circle, and the presence or absence of cell (S) was determined by presence or absence of a cell of not less than 0.01 μm and less than 1 μm in equivalent diameter circle. The equivalent diameter circle herein is a diameter of a circle having the same area as the area of a cell. The equivalent diameter circle was obtained by a cell cross-sectional area after the SEM image scanned by the above-described magnification ratio was treated in the same way as the foregoing (1) by an image treating apparatus (manufactured by Pierce Company, part number: PIAS-II). Namely, the cross-sectional area of the cell part marked black was able to be calculated by the image treating apparatus, and a diameter of a circle having the same cross-sectional area as this cross-sectional area was defined as equivalent diameter circle.

(4) Average Cell Diameter of Cell (L) and Cell (S)

Using a scanning electron microscope (FE-SEM) manufactured by JEOL Ltd., an image of the cross section in the thickness direction of resin foam being enlarged by 100 times was scanned. From the image scanned, cells of not less than 1 μm and not more than 1000 μm in equivalent diameter circle were chosen, and the average of the total numbers was defined as the average cell diameter of cell (L).

Next, an image of bubble wall surface at the center being enlarged by 10000 times was scanned. The image scanned was divided into 4 blocks on left, right, top and bottom, cells of not less than 0.01 μm and less than 1 μm in equivalent diameter circle per one block were chosen, and the average of the total numbers was defined as the average cell diameter of cell (S).

Using SEM images of 5 places per one sample of resin foam (n=5), the average of 5 times was defined as the average of cell (L) and cell (S).

(5) Cell Size Distribution of Resin Foam

The cross section in the thickness direction of resin foam was observed by a magnification ratio of Table 1 using a scanning electron microscope (FE-SEM) manufactured by JEOL Ltd. To make a cross section of resin foam visible, a cross-section polisher (CP) method using argon ion beam was used.

In each magnification ratio of a microscope shown in Table 1, cells of 100 pieces were chosen randomly, the minor axis part (Ls) and major axis part (Ll) per one cell were measured in "two-point distance." The average of (Ls) and (Ll) was defined as an average cell diameter (La)n of one cell (where n=1 to 100), a histogram of the average cell diameter (La)n in each magnification ratio was drawn. Incidentally, like presence at the edge of a SEM image, a cell that the whole length of cell diameter was unobservable was not measured.

Regarding the drawing of histogram, it was drawn in such a manner that the number of classes (pillars) was 10, and the width was calculated for the value of (La)n to be not present in the border value of class (pillar).

In sampling a cell at each magnification ratio, double count of the same cell in measurement was avoided by setting the lower limit (or the upper limit).

The histograms at each magnification ratio thus obtained were linked, which was defined as a cell size distribution.

In a curve that medians at each frequency in the cell size distribution were linked, the medium in the frequency that the slope became a limit value, that is, the medium in the frequency that the slope of curve was changed from positive to negative was defined as a peak.

TABLE 1

| Microscope magnificationa | Cell diameter to be measured |
| --- | --- |
| Magnification 50 times | Cell diameter of not less than 100 μm |
| Magnification 300 times | Cell diameter of not less than 10 μm and less than 100 μm |
| Magnification 3000 times | Cell diameter of not less than 1 μm and less than 10 μm |
| Magnification 25000 times | Cell diameter of not less than 0.5 μm and less than 1.0 μm |
| Magnification 50000 times | Cell diameter of not less than 0.1 μm and less than 0.5 μm |
| Magnification 100000 times | Cell diameter of less than 0.1 μm |

(6) Measurement of Carbon Dioxide Gas Permeability and Water Vapor Permeability of Resin Film In the condition of a temperature at 23° C. and a humidity at 0% RH, based on a gas chromatographic method described in JIS K7126-2 (2006)), carbon dioxide gas permeability was measured using a gas permeability measuring apparatus (GL Science Inc.: GPM-250). The measurement was conducted twice, and the average of two measured values was defined as carbon dioxide gas permeability.

In the condition of a temperature at 40° C. and a humidity at 90% RH, based on an infrared sensor method described in JIS K7129 (2008), water vapor permeability was measured using a humidity transmission measuring apparatus (USA, MOCOM: "PERMATRAN-W3/31"). The measurement was conducted twice, and the average of two measured values was defined as water vapor permeability.

(7) Measurement of Thermal Conductivity

It was measured using a thermal conductivity measuring apparatus "TPS-2500" manufactured by Hot Disk Corporation. As the measuring place, 5 places of a center part and four corners of a heat insulating material were measured, and each average was defined as thermal conductivity.

For the heat insulating material measured, after ageing test was done using a constant temperature, constant humidity bath, and a vacuum oven under the following environment, thermal conductivity was measured once again.

Measuring Condition of Thermal Conductivity
　Temperature: 23° C.
　Humidity: 65% RH
　Sensor: 7 mmφ (covered with polyimide)

Aging Test Condition
　Aging test (1): temperature 60° C., humidity 85% RH, 250 hours
　Aging test (2): temperature 40° C., humidity 0% RH, vacuum 300 Torr, 1000 hours (8) Thermal Insulation Performance of Resin Foam Alone Since a blowing agent in a production process remains in a resin foam, whose thermal insulation performance greatly varies dependent on the kind of blowing agent used. Thus, as the evaluation of thermal insulation performance, the following pretreatment was conducted, and a blowing agent in a resin foam was completely replaced with air to measure thermal insulation performance. The measurement was done using a thermal conductivity measuring apparatus "TPS-2500" manufactured by Hot Disk Corporation. As the measuring place, 5 places of a center part and four corners of a resin foam were measured, and each average was defined as thermal conductivity.

Measuring Condition of Thermal Conductivity
　Temperature: 23° C.
　Humidity: 65% RH
　Sensor: 7 mmφ (covered with polyimide)

Pretreatment
　a) A resin foam was placed in a desiccator, and vacuumed to 300 Torr at 23° C., and allowed to stand still for 10 hours,
　b) Next, it was gradually returned to ambient pressure over 2 hours in air.

After the cycle of a) and b) was carried out 10 cycles, the resin foam was taken out from the desiccator, and measurement of thermal conductivity was conducted.

(9) Condensation Test of Heat Insulating Material (A) Condensation preventing performance was evaluated on the basis of "condensation preventing performance test method of fitting (JIS A1514)." Air temperature in a constant temperature high humidity room and a low temperature room was set at 20° C., and relative humidity in a constant temperature high humidity was set at about 40% RH, after confirmation that the temperature of each part of heat insulating material came to equilibrium sufficiently (confirm that the surface temperature of heat insulating material is equilibrated sufficiently with air temperature in a constant temperature high humidity), temperature in the low temperature room was changed to 5° C. to −10° C. by 5° C. intervals. The observation of condensation was done in such a manner that after temperature measurement was finished, relative humidity in the constant temperature high humidity room was raised to 50% RH, the state was kept for 1 hour, and evaluated by naked eye. The evaluation was; o: cloudy, Δ: small droplet (diameter of 1 mm or less), and x: large droplet (diameter exceeding 1 mm).

(B) As a wall condensation preventing test of a heat insulating material, air temperature in a constant temperature high humidity room and a low temperature room was set at 20° C., and relative humidity in a constant temperature high humidity was set at about 85% RH, after confirmation that the temperature of each part of heat insulating material came to equilibrium sufficiently (confirm that the surface temperature of heat insulating material is equilibrated sufficiently with air temperature in a constant temperature high humidity), the temperature in a low temperature room was set at −5° C. The observation of wall condensation was done in such a manner that after temperature measurement was finished, relative humidity in the constant temperature high humidity room was raised to 85% RH, the state was kept for 1000 hours, then, presence or absence of condensation inside the low temperature room of heat insulating material was evaluated by naked eye. Namely, whether water vapor in a constant temperature high humidity passes through the heat insulating material to reach the low temperature room side or not was determined by naked eye. The surface of low temperature room side of heat insulating material was evaluated as 0: no generation of frost, and x: generation of frost.

Additionally, wall condensation means that in the case of providing a wall of a building with a heat insulating material, condensation is generated resulting from that water vapor inside room passes through the heat insulating material, water vapor is cooled between the heat insulating material and the wall surface of the building.

(10) Concentration of Carbon Dioxide Gas Inside Heat Insulating Material

It was analyzed/measured by a headspace gas analyzer equipped with GC/MS equipment. As the carrier gas, a helium gas of 99.8% purity in cylinder was used.

(i) As a base line, a peak of helium of carrier gas was detected, and the peak area (BPh) was calculated.

(ii) Next, a sampling needle was inserted by 5 cm or more in the most longitudinal direction of a heat insulating material, 5 mL of gas inside the heat insulating material was sampled.

(iii) The gas sampled was mixed with helium carrier gas, and injected in a column of GC/MS equipment.

(iv) From MS analysis of gases separated by GC, peaks of helium, nitrogen, oxygen, hydrocarbons and carbon dioxide were detected, and each peak area (Ph), (Pn), (Po), (Phc) and (Pc) were calculated.

(v) From the peak area obtained, concentration of carbon dioxide gas inside the heat insulating material was calculated by the following formula:

$$\text{Carbon dioxide gas concentration [\%]} = \{Pc/(Ph-BPh+Pn-Po+Phc+Pc)\} \times 100.$$

(vi) The number of measuring samples was set to 5 (n=5), and the average of 5 times was defined as carbon dioxide gas concentration.

(11) Carbon Dioxide Solubility in Each Resin

Using a magnetic suspension balance (MSB), under carbon dioxide gas atmosphere, the amount of carbon dioxide gas (g) dissolved in 1 g of resin sample was measured. The number of measuring samples was set to 5 (n=5), and the average of 5 times was defined as carbon dioxide gas-dissolved amount. Given that the weight impregnated with carbon dioxide gas by the same weight as the resin sample weight is 100%, solubility (%) in each sample was calculated.

(12) Meaning of the Symbol in Table

Resin (A-1): Polylactic acid (weight-average molecular weight of 150000, L body of 96%)

Resin (A-2): Polymethylmethacrylate (manufactured by Mitsubishi Rayon Co., Ltd., "Acrypet MF," fluidity: 14 g/10 min, refractive index=1.490)

Resin (A-3): Polyethylene glycol (manufactured by Sanyo Chemical Industries, Ltd., "PEG-6000S," number-average molecular weight of 8300)

Resin (A-4): Polystyrene (manufactured by PS Japan Corporation, "G9401," MFR=2.2)

Resin (A-5): Polyether-polylactic acid block copolymer (produced as follows: that is, in a sealed vessel equipped with a vacuum line and a heating apparatus, 0.85 kg of polyethylene glycol with a number-average molecular weight of 8,500 was charged, after dehydration under reduced pressure at 140° C. for 30 minutes, 0.5 kg of L-lactide was charged. Next, the inside of the vessel was replaced with inert gas, while polyethylene glycol and L-lactide were melted and stirred, 10 g of tin (II) 2-ethylhexanate was added, and stirred under inert gas atmosphere at 160° C. for 3 hours, then, 7.5 g of dimethyl phosphate was added as a catalyst deactivating agent and stirred for 30 minutes. Next, after stirring at 140° C. for 2 hours under reduced pressure to remove a volatile substance, it was returned to atmosphere pressure with inert gas, thereby obtaining a polyether-polylactic acid block copolymer of 13,500 in molecular weight.)

Resin (A-6): Polymethylmethacrylate (manufactured by Sumitomo Chemical Co., Ltd., "Sumipex MHF")

Resin (A-7): Polypropylene (manufactured by Japan Polypropylene Corporation, "Newfoamer")

Resin (A-8): Acrylonitrile-butadiene-styrene resin (manufactured by Toray Industries, Inc., "Toyolac 600")

Fiber-based heat insulating material (GW-1): Glass wool (manufactured by Asahi Fiber Glass Co., Ltd. "Mat Ace Plus")

Blowing agent (F-1): Carbon dioxide gas (supercritical penetration)

Foam nucleating agent (T-1): Talc (manufactured by Japan Talc Co., Ltd., "SG-95," average particle diameter of 2.5 μm)

Resin (B-1): Polyethylene terephthalate (manufactured by Mitsui Chemicals, Inc., "Mitsui PET J120")

Resin (B-2): Polybutylene terephthalate (manufactured by Toray Industries, Inc., "1200S")

Resin (B-3): Polyglycol acid (produced as follows: that is, 70% glycol acid aqueous solution was heated at 180° C. under nitrogen stream, thereafter, gradually vacuumed to $1.0 \times 10^{-2}$ MPa to concentrate glycol acid. At the point when water of about 30 weight % relative to the amount of glycol acid aqueous solution was distilled away, triphenyl phosphite of about 0.14% relative to the amount of glycol acid aqueous solution was added. After 5 minutes, antimony trioxide and ethylene glycol were added by about 0.13% and about 0.5%7, respectively, relative to the amount of glycol acid aqueous solution, temperature and degree of vacuum were further raised while stirring, when a reaction product started solidifying at 200° C. and $5.0 \times 10^{-4}$ MPa, a stirring rod was lifted above the reaction fluid level, further, reaction was carried out till the reaction product was completely solidified. After completion of reaction, the reaction product was cooled to room temperature under nitrogen atmosphere, and pulverized into a powder state. This low polymer pulverized was subjected to polycondensation reaction at 200° C. and $5.0 \times 10^{-4}$ MPa for 40 hours, thereby obtaining a polyglycol acid of pale yellow being almost not colored. Additionally, the polyglycol acid obtained was used to make a solution of 0.5 g/dl in concentration with a mixed solvent of phenol/2,4,5-trichlorophenol (10/7 (weight ratio)), using an Ubbelohde type viscometer, $\eta sp/C$ at 30.0±0.1° C. was obtained to find 0.63. From $^1H$-NMR analysis of this polymer, it was able to be confirmed that 0.004 mole of ethylene glycol unit was contained in a molecular chain of polymer relative to 1 mole of glycol acid unit.)

Resin (B-4): Polylactic acid (weight-average molecular weight of 50000, L body of 95%)

Resin (B-5): Ethylene vinyl alcohol resin (Kuraray Co., Ltd., "Eval")

Film (C-1): Polyethylene film (manufactured by Toray Industries, Inc., "Toretex")

Film (C-2): Polypropylene film (manufactured by Toray Industries, Inc., "Torefan BO")

Metal (M-1): Aluminum (manufactured by Nippon Light Metal Co., Ltd., "high-purity aluminum wire")

Primer (P-1): Acrylonitrile type coating agent

Example 1

Using a tandem type extruder equipped with a supply line of supercritical carbon dioxide, pellets of resin (A-1) and resin (A-2) were mixed in a ratio of Table, and supplied to the first extruder, melted at 220° C., then, supercritical carbon dioxide was supplied at the tip of the extruder. Next, this was cooled down to 170° C. by the second extruder, and extruded into air through a slit die of 10 cm long, thereby to obtain a resin foam of 10 mm thick. Carbon dioxide solubility in resin (A-1) was 5.5%, and carbon dioxide solubility in resin (A-2) was 3.7%.

The evaluation result of the resin foam is shown in Table 2. Porosity (X) was 97%, the number density of cell (L) was $10^6/mm^2$, and the number density of cell (S) was $10^6/m^2$.

Next, resin (B-1) was supplied to a single screw extruder, heated at 160 to 280° C., and extruded in a sheet-shape through a T-die. The sheet extruded was wound around a mirror-surface drum of a temperature of 20° C. to be cooled and solidified, and drawn by 3 times in the longitudinal direction using a drawing roll of a preheating temperature of 80° C. and a drawing temperature of 100° C., then, drawn by 3 times in the width direction using a tenter of a preheating temperature of 90° C. and a heating temperature of 120° C. Subsequently, while relaxation of 5% was given in the width direction, heat treatment was conducted at a temperature of 180° C. for 10 seconds, obtaining a resin film.

Next, in 40 weight % compost sampled from compost including microbe having biodegradability, 20 weight % polylactic acid emulsion and 40 weight % warm water of 30° C. were put, stirred for 24 hours, and filtrated in several installments. Next, starch of the same weight as that of filtrate was added to give an adhesive aqueous solution.

Two pieces of film that the above-described aqueous solution was uniformly coated on non-vapor metalized surface of a resin film having a vapor deposition layer were prepared, and stuck to a resin foam like wrapping up.

A carbon dioxide gas/water vapor barrier film run of from four corners of the resin foam was subjected to thermal adhesion with an impulse sealer to give a heat insulating material.

The evaluation result of the heat insulating material obtained is shown in Table 3.

Example 2

Using resin (A-1) and resin (A-3), a resin foam of 10 mm thick was obtained by extrusion blowing in the same way as Example 1. Carbon dioxide solubility in resin (A-1) was 5.5%, and carbon dioxide solubility in resin (A-3) was 9.0%. The evaluation result of the resin foam is shown in Table 2. Porosity (X) was 95%, the number density (L) was $10^6/mm^2$, and the number density (S) was $10^5/\mu m^2$.

Next, in an extruder A equipped with a two layer lamination pinole just before a T-die, pellets of resin (B-1) and resin (B-2) were mixed by a ratio of 40:60 in weight ratio and supplied. Next, resin (B-3) was supplied to an extruder B linked the pinole with a short pipe. The extruder A and B were heated at 160 to 280° C. and at 160 to 240° C., respectively, and a sheet was extruded through the T-die for the lamination ratio (thickness) to be 4:1 in extruder A and B. The sheet extruded was wound around a mirror-surface drum of a temperature of 20° C. to be cooled and solidified, and drawn by 3 times in the longitudinal direction using a drawing roll of a preheating temperature of 50° C. and a drawing temperature of 55° C., then, drawn by 3 times in the width direction using a tenter of a preheating temperature of 50° C. and a drawing temperature of 53° C. Subsequently, while relaxation of 5% was given in the width direction, heat treatment was conducted at a temperature of 180° C. for 10 seconds, obtaining a biaxially drawn film.

The film was subjected to corona treatment of 30 W·min/$m^2$ while a film temperature was kept at 55° C. under a mixed gas atmosphere of nitrogen and carbon dioxide gas (carbon dioxide gas concentration ratio of 15 volume %), and wound up. This was set in a vacuum evaporation apparatus equipped with a film travelling device, and travelled via a cooling metal drum of 20° C. after setting to a highly reduced pressure sate of $1.00 \times 10^{-2}$ Pa. In this time, metal (M-1) was heated and evaporated, and a vapor deposition thin film layer was formed on the surface where resin (B-3) was laminated. After vapor deposition, the inside of vapor evaporation apparatus was returned to ambient pressure, the film wound up was rewound, and aged at a temperature of 40° C. for 2 days to obtain a resin film with a vapor deposition layer. Additionally, optical concentration of a metal layer was confirmed in-line during vapor deposition, and control was done for the optical concentration to be 2.5. The thickness of the resulting resin film with a vapor deposition layer was 20 μm.

For covering the above-described resin foam with the resin film, two pieces of the resin film trimmed to 15 cm square and the resin foam cut to 10 cm square were prepared. Next, the resin films were set in the opposite side of vapor deposition surface, namely, in such a way that the surfaces of finely dispersed layer of resin (B-1) and resin (B-2) faced each other, and the three sides of four sides were subjected to thermal adhesion with an impulse sealer, giving a bag-shape. The width of thermal adhesion was set to 1 cm from the edge of film. Next, after the resin foam was put therein from one side not subjected to thermal adhesion, a heat insulating material was made immediately by conducting thermal adhesion with an impulse sealer to be closely sealed. Additionally, regarding the resin foam used, a resin foam right after blowing was used, so the above-described sealing operation was done quickly.

The evaluation result of the heat insulating material obtained is shown in Table 3.

Example 3

Using resin (A-1) and resin (A-4), a resin foam of 15 mm thick was obtained by extrusion blowing in the same way as Example 1. Carbon dioxide solubility in resin (A-1) was 5.5%, and carbon dioxide solubility in resin (A-4) was 3.0%. The evaluation result of the resin foam is shown in Table 2. Porosity (X) was 84%, the number density of cell (L) was $10^4/mm^2$, and the number density of cell (S) was $10^3 \mu m^2$.

Next, resin (B-1) was supplied to a single screw extruder, and a biaxially drawn film was obtained in the same manner as Example 1.

Metal (M-1) was deposited on film (C-2) in the same method as in Example 2 to obtain a vapor deposition film. Next, primer (P-1) was coated on the vapor metalized surface of the vapor deposition film, and stuck to the biaxially drawn film by dry lamination to give a resin film.

Using the resin foam and resin film obtained, a heat insulating material was obtained in the same way as Example 2.

The evaluation result of the heat insulating material obtained is shown in Table 3.

Example 4

Using resin (A-1) and resin (A-3), a resin foam of 10 mm thick was obtained by extrusion blowing in the same way as Example 1. The evaluation result of the resin foam is shown in Table 2. Porosity (X) was 95%, the number density (L) was $10^6/mm^2$, and the number density (S) was $10^5 \, \mu m^2$.

Next, after a biaxially drawn film of resin (B-1) was obtained using a single screw extruder in the same way as Example 1, metal (M-1) was deposited on one surface thereof in the same method as in Example 2 to obtain to obtain a resin film.

Using the resin foam and resin film obtained, a heat insulating material was obtained in the same method as in Example 2.

The evaluation result of the heat insulating material obtained is shown in Table 3.

Example 5

A resin foam was obtained in the same method as in Example 4.

Next, using resin (B-3), being drawn by 3 times in the longitudinal direction using a drawing roll at a preheating temperature of 60° C. and a drawing temperature of 70° C., immediately cooled to room temperature, and drawn by 3 times in the width direction using a tenter at a preheating temperature of 65° C. and a drawing temperature of 80° C., subsequently, subjected to heat treatment at a temperature of 85° C. for 10 seconds while relaxation of 5% was given in the width direction, thereby a biaxially drawn film was obtained. A heat insulating material was obtained in the same method as in Example 1 in regard to other points.

The evaluation result of the heat insulating material obtained is shown in Table 3.

Example 6

Using resin (A-1) and resin (A-4), a resin foam of 10 mm thick was obtained by extrusion blowing in the same way as Example 1. The evaluation result of the resin foam is shown in Table 2. Porosity (X) was 81%, the number density (L) was $10^3/mm^2$, and the number density (S) was $10^1/\mu m^2$.

Next, using resin (B-5), being drawn by 3 times in the longitudinal direction using a drawing roll at a preheating temperature of 50° C. and a drawing temperature of 70° C., immediately cooled to room temperature, and drawn by 3 times in the width direction using a tenter at a preheating temperature of 90° C. and a drawing temperature of 120° C., subsequently, subjected to heat treatment at a temperature of 160° C. for 10 seconds while relaxation of 5% was given in the width direction, thereby a biaxially drawn film was obtained.

A heat insulating material was obtained in the same method as in Example 1 in regard to other points.

The evaluation result of the heat insulating material obtained is shown in Table 3

Example 7

Figure 4:
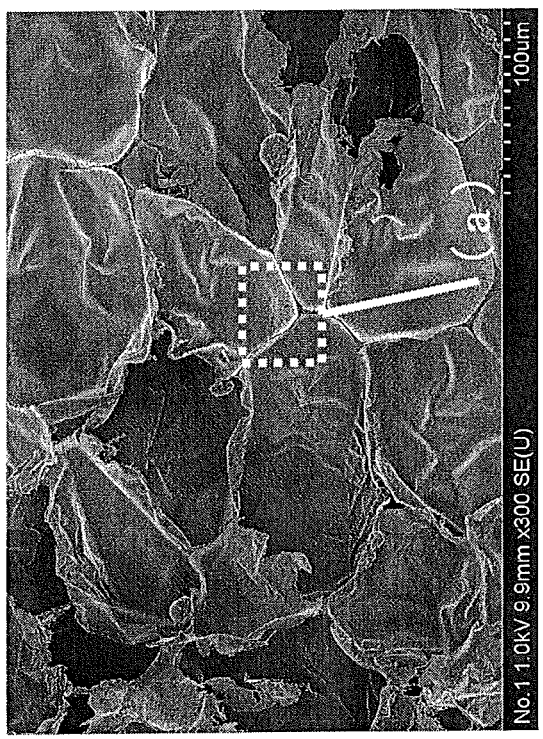
FIG. 4 is a SEM picture of the resin foam obtained by Example 7.
Figure 5:
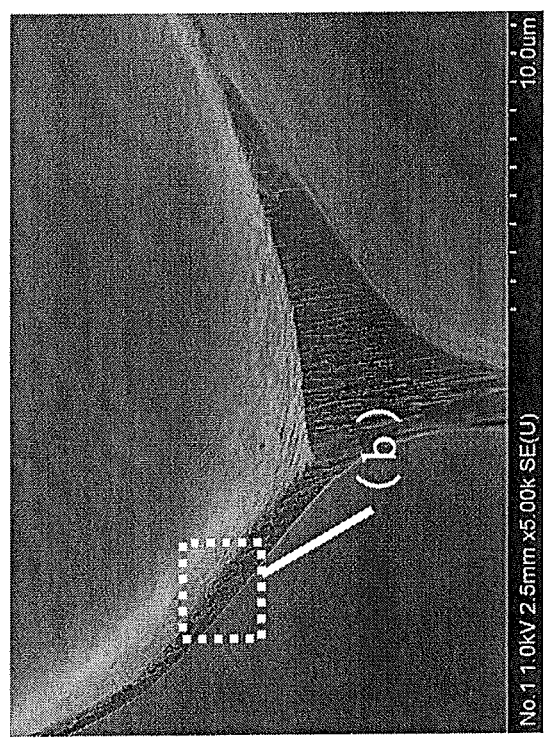
FIG. 5 is an enlarged view of (a) part of FIG. 4.
Figure 6:
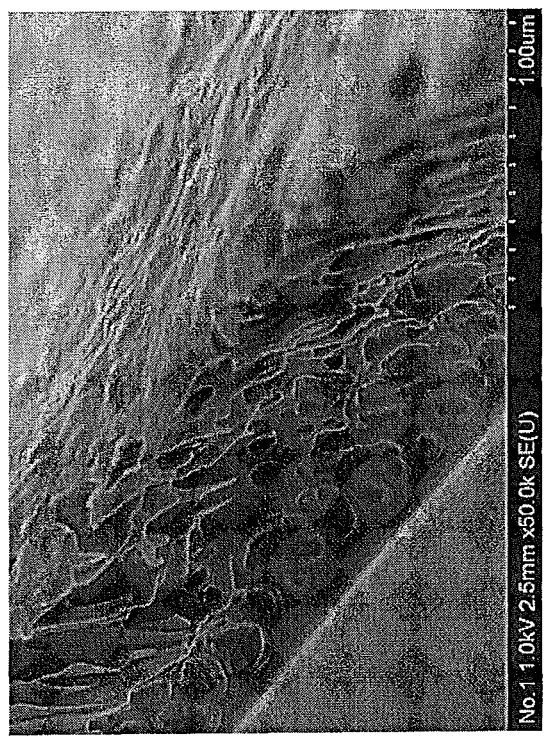
FIG. 6 is an enlarged view of (b) part of FIG. 5.

Resin (A-1), resin (A-5) and resin (A-6) were blended in a ratio of Table, to 100 parts by weight thereof, 5 parts by weight of foam nucleating agent (T-1) was added, and supplied to a tandem type extruder equipped with a supply line of supercritical carbon dioxide. After heat-melting at 180 to 220° C. in the first extruder, supercritical carbon dioxide was supplied. Subsequently, this was cooled down to 120 to 170° C. by the second extruder, and extruded into air through a slit die of 10 cm long, thereby to obtain a resin foam of 10 mm thick. Additionally, carbon dioxide solubility in resin (A-1) was 5.5%, carbon dioxide solubility in resin (A-5) was 9%, and carbon dioxide solubility in resin (A-6) was 3.7%. The distributed domain of resin (A-5) was 0.01 to 0.02 µm from TEM observation after OsO4 dying. The evaluation result of the resin foam obtained is shown in Table 2. SEM pictures of cross section of the resin foam are shown in FIG. 4 to FIG. 6. Porosity (X) was 97%, the number density (L) was $10^3/mm^2$, and the number density (S) was $10^3 \, \mu m^2$.

Next, a vapor deposition film was obtained in the same way as Example 2. Thereafter, primer (P-1) was coated on the resin surface opposite to the vapor metalized surface of the vapor deposition film obtained, film (C-2) was stuck on the vapor metalized surface and film (C-1) was stuck on the resin surface by dry lamination, thereby to give a resin film.

For covering the above-described resin foam with the resin film, two pieces of the resin film trimmed to 15 cm square and the resin foam cut to 10 cm square were prepared. Next, a bag-shape was made in such a manner that the surfaces of film (C-1) faced each other and, the three sides of four sides were subjected to thermal adhesion with an impulse sealer. The width of thermal adhesion was set to 1 cm from the edge of film. Next, after the resin foam was put therein from one side not subjected to thermal adhesion, a heat insulating material was made immediately by conducting thermal adhesion with an impulse sealer to be closely sealed. Additionally, regarding the resin foam used, a resin foam right after blowing was used, so the above-described sealing operation was done quickly.

The evaluation result of the heat insulating material obtained is shown in Table 3.

Example 8

Resin (A-1), resin (A-5) and resin (A-8) were blended in a ratio of Table, to 100 parts by weight thereof, 5 parts by weight of foam nucleating agent (T-1) was added, a resin foam was obtained in the same method as in Example 7. Additionally, the distributed domain of resin (A-5) was 0.01 to 0.03 µm from TEM observation after OsO4 dying.

The evaluation result of the resin foam obtained is shown in Table 2. Porosity (X) was 93%, the number density (L) was $10^2/mm^2$, and the number density (S) was $10^3/m^2$.

Next, using resin (B-5), being drawn by 3 times in the longitudinal direction using a drawing roll at a preheating temperature of 50° C. and a drawing temperature of 70° C., immediately cooled to room temperature, and drawn by 3 times in the width direction using a tenter at a preheating temperature of 90° C. and a drawing temperature of 120° C., subsequently, subjected to heat treatment at a temperature of 160° C. for 10 seconds while relaxation of 5% was given in the width direction, thereby a biaxially drawn film was obtained. In regard to this biaxially drawn film obtained, metal (M-1) deposition was conducted in the same method as in Example 7 to obtain a vapor deposition film. Next, in the same method as in Example 7, film (C-1) and film (C-2) were stuck thereon by dry lamination to give a resin film.

By covering the above-described resin foam with the resin film in the same method as in Example 7, a heat insulating material was made.

The evaluation result of the heat insulating material obtained is shown in Table 3.

Example 9

Resin (A-4), resin (A-6) and resin (A-8) were blended in a ratio of Table, to 100 parts by weight thereof, 5 parts by weight of foam nucleating agent (T-1) was added, a resin foam was obtained in the same method as in Example 7, and the resin foam was evaluated for thermal insulation performance. The evaluation result of the resin foam obtained is shown in Table 2. Porosity (X) was 93%, the number density (L) was $10^{18}/mm^2$, and the number density (S) was $10^{1.6}/\mu m^2$.

Next, metal (M-1) deposition was conducted on film (C-2) in the same method as in Example 2 to obtain a resin film.

By covering the above-described resin foam with the resin film in the same method as in Example 7, a heat insulating material was made.

The evaluation result of the heat insulating material obtained is shown in Table 3.

Comparative Example 1

Using a tandem type extruder equipped with a supply line of supercritical carbon dioxide, resin (A-3) and resin (A-4) were mixed in a ratio of Table, and supplied to the first extruder, melted at 200 to 220° C., then, supercritical carbon dioxide was supplied at the tip of the extruder. Next, this was cooled down to 120 to 170° C. by the second extruder, and extruded into air through a slit die of 10 cm long, thereby to obtain a resin foam of 10 mm thick. Additionally, carbon dioxide solubility in resin (A-3) was 9.0%, and carbon dioxide solubility in resin (A-4) was 3.0%. The distributed domain of resin (A-3) was 2.0 to 10 μM from TEM observation after OsO4 dying. The evaluation result of the resin foam obtained is shown in Table 4.

Next, a vapor deposition film and a heat insulating material were obtained in the same way as Example 2.

The evaluation result of the heat insulating material obtained is shown in Table 5.

Comparative Example 2

To 100 parts by weight of resin (A-4), 5 parts by weight of foam nucleating agent (T-1) was added, using a tandem type extruder equipped with a supply line of supercritical carbon dioxide, a resin foam was obtained in the same method as in Comparative Example 1. The evaluation result of the resin foam obtained is shown in Table 4.

Next, resin (B-1) was supplied to a single screw extruder, and a biaxially drawn film was obtained in the same way as Comparative Example 1. Next, metal (M-1) deposition was conducted on film (C-2) in the same method as in Comparative Example 1 to obtain a vapor deposition film. Next, primer (P-1) was coated on the vapor metalized surface of the vapor deposition film, and stuck to the above-described biaxially drawn film by dry lamination to give a resin film.

By covering the resin foam obtained with the resin film in the same method as in Comparative Example 1, a heat insulating material was obtained.

The evaluation result of the heat insulating material obtained is shown in Table 5.

Comparative Example 3

Resin (A-3) and resin (A-7) were kneaded in a ratio of Table by a biaxial extruder to obtain strand chips. Using the strand chips obtained, they were blown in the same method as in Comparative Example 1. Next, for the purpose of removing resin (A-3), the foam was soaked in warm water of 40° C., stirred for 10 minutes, then, taken out from warm water, and sufficiently dried to obtain a resin foam. Additionally, carbon dioxide solubility in resin (A-3) was 9.0%, and carbon dioxide solubility in resin (A-7) was 7%. Dispersion diameter of resin (A-3) was 0.5 μm. The evaluation result of the resin foam obtained is shown in Table 4.

Next, a resin film was obtained in the same way as Example 1.

For covering the above-described resin foam with the resin film, two pieces of the resin film trimmed to 15 cm square and the resin foam cut to 10 cm square were prepared. Next, a bag-shape was made in such manner that the three sides of four sides of the resin film were subjected to thermal adhesion with an impulse sealer. The width of thermal adhesion was set to 1 cm from the edge of film. Next, after the resin foam was put therein from one side not subjected to thermal adhesion, a heat insulating material was made immediately by conducting thermal adhesion with an impulse sealer to be closely sealed. Additionally, regarding the resin foam used, a resin foam right after blowing was used, so the above-described sealing operation was done quickly.

The evaluation result of the heat insulating material obtained is shown in Table 5.

Comparative Example 4

Resin (A-3) and resin (A-7) were kneaded in a ratio of Table by a biaxial extruder to obtain strand chips. Using the strand chips obtained, they were blown in the same method as in Comparative Example 3. Next, for the purpose of removing resin (A-3), the foam was soaked in warm water of 40° C., stirred for 10 minutes, then, taken out from warm water, and sufficiently dried to obtain a resin foam. Additionally, dispersion diameter of resin (A-3) was 3 μm. The evaluation result of the resin foam obtained is shown in Table 4.

Comparative Example 5

In place of resin foam, fiber-based heat insulating material (GW-1) was used. The fiber-based heat insulating material (GW-1) was covered by using film (C-1) in the same method as in Comparative Example 1.

TABLE 2

| | | | Example 1 | Example 2 | Example 3 | Example 4 | Example 5 | Example 6 | Example 7 | Example 8 |
|---|---|---|---|---|---|---|---|---|---|---|
| Resin foam | Resin(A-1) | Weight % | 80 | 80 | 60 | 80 | 80 | 50 | 75 | 75 |
| | Resin(A-2) | Weight % | 20 | — | — | — | — | — | — | — |
| | Resin(A-3) | Weight % | — | 20 | — | 20 | 20 | — | — | — |
| | Resin(A-4) | Weight % | — | — | 40 | — | — | 50 | — | — |
| | Resin(A-5) | Weight % | — | — | — | — | — | — | 5 | 5 |
| | Resin(A-6) | Weight % | — | — | — | — | — | — | 20 | — |
| | Resin(A-7) | Weight % | — | — | — | — | — | — | — | — |
| | Resin(A-8) | Weight % | — | — | — | — | — | — | — | 20 |
| | Fiber-based heat insulating material (GW-1) | Weight % | — | — | — | — | — | — | — | — |

TABLE 2-continued

|  |  | Example 1 | Example 2 | Example 3 | Example 4 | Example 5 | Example 6 | Example 7 | Example 8 |
|---|---|---|---|---|---|---|---|---|---|
| Blowing agent (F-1) | Weight % | 7 | 7 | 7 | 7 | 7 | 7 | 7 | 7 |
| Foam nucleating agent (T-1) | Part by weight | — | — | — | — | — | — | 5 | 5 |
| Porosity (X) | % | 97 | 95 | 84 | 95 | 95 | 81 | 97 | 93 |
| Porosity (X2) | % | 97 | — | — | — | — | — | 97 | 95 |
| Cell (L) number density | Pieces/mm$^2$ | $10^6$ | $10^6$ | $10^4$ | $10^6$ | $10^6$ | $10^3$ | $10^3$ | $10^2$ |
| Cell (S) number density | Pieces/μm$^2$ | $10^6$ | $10^5$ | $10^3$ | $10^5$ | $10^5$ | $10^1$ | $10^3$ | $10^3$ |
| Cell size distribution (peak 1) | μm | 10 | 10 | 10 | 10 | 10 | 50 | 50 | 100 |
| Cell size distribution (peak 2) | μm | 0.01 | 0.01 | 0.02 | 0.01 | 0.01 | 0.10 | 0.02 | 0.05 |
| Thermal insulation performance | mW/mK | 27.0 | 27.0 | 29.0 | 27.0 | 27.0 | 29.5 | 27.0 | 27.5 |

TABLE 3

|  |  |  | Example 1 | Example 2 | Example 3 | Example 4 | Example 5 | Example 6 | Example 7 | Example 8 |
|---|---|---|---|---|---|---|---|---|---|---|
| Resin film | Resin(B-1) |  | ○ | ○ | ○ | ○ | — | — | ○ | — |
|  | Resin(B-2) |  | — | ○ | — | — | — | — | ○ | — |
|  | Resin(B-3) |  | — | ○ | — | — | ○ | — | ○ | — |
|  | Resin(B-4) |  | — | — | — | — | — | — | — | — |
|  | Resin(B-5) |  | — | — | — | — | — | ○ | — | ○ |
|  | Film (C-1) |  | — | — | — | — | — | — | ○ | ○ |
|  | Film (C-2) |  | — | — | ○ | — | — | — | ○ | ○ |
|  | Metal (M-1) |  | — | Al | Al | Al | — | — | Al | Al |
|  | Primer (P-1) |  | — | — | ○ | — | — | — | ○ | ○ |
|  | Film thickness | μm | 10 | 20 | 20 | 20 | 20 | 20 | 21 | 21 |
|  | Lamination number of resin film | Lamination number | 1 | 2 | 2 | 1 | 1 | 1 | 4 | 3 |
|  | Carbon dioxide gas volume | Volume % | 80 | 80 | 80 | 80 | 80 | 80 | 80 | 80 |
|  | Carbon dioxide gas permeability | mL/(m$^2$·atm·day) | 12.0 | 0.1 | 1.6 | 4.2 | 1.0 | 0.9 | 0.07 | 0.10 |
|  | Water vapor permeability | g/(m$^2$·day) | 18.0 | 2.0 | 3.0 | 4.9 | 4.8 | 4.5 | 1.2 | 1.00 |
| Thermal conductivity | Right after production | mW/mK | 24.0 | 21.0 | 22.0 | 23.5 | 22.0 | 22.0 | 21.0 | 21.0 |
|  | Aging test (1) | mW/mK | 30.0 | 22.5 | 23.5 | 25.5 | 24.0 | 23.0 | 21.5 | 22.5 |
|  | Aging test (2) | mW/mK | 32.0 | 23.0 | 23.5 | 26.0 | 24.5 | 24.0 | 22.0 | 23.0 |
| Condensation test | Condensation preventing performance | JISA 1514 | Δ | ○ | ○ | ○ | ○ | ○ | ○ | ○ |
|  | Wall condensation preventing test |  | x | ○ | ○ | ○ | ○ | ○ | ○ | ○ |

TABLE 4

|  |  |  | Comparative Example 1 | Comparative Example 2 | Comparative Example 3 | Comparative Example 4 | Comparative Example 5 |
|---|---|---|---|---|---|---|---|
| Resin foam | Resin(A-1) | Weight % | — | — | — | — | — |
|  | Resin(A-2) | Weight % | — | — | — | — | — |
|  | Resin(A-3) | Weight % | 10 | — | 1 | 5 | — |
|  | Resin(A-4) | Weight % | 90 | 100 | — | — | — |
|  | Resin(A-5) | Weight % | — | — | — | — | — |
|  | Resin(A-6) | Weight % | — | — | — | — | — |
|  | Resin(A-7) | Weight % | — | — | 99 | 95 | — |
|  | Resin(A-8) | Weight % | — | — | — | — | — |
|  | Fiber-based heat insulating material (GW-1) | Weight % | — | — | — | — | 100 |
|  | Blowing agent (F-1) | Weight % | 7 | 7 | 7 | 7 | — |
|  | Foam nucleating agent (T-1) | Part by weight | — | 5 | — | — | — |
|  | Porosity (X) | % | 85 | 93 | 60 | 60 | 90 |
|  | Porosity (X2) | % | — | — | — | — | — |
|  | Cell (L) number density | Pieces/mm$^2$ | — | — | $10^6$ | $10^{4.6}$ | — |
|  | Cell (S) number density | Pieces/μm$^2$ | — | — | 1 | — | — |

TABLE 4-continued

|  |  | Comparative Example 1 | Comparative Example 2 | Comparative Example 3 | Comparative Example 4 | Comparative Example 5 |
|---|---|---|---|---|---|---|
| Cell size distribution (peak 1) | μm | 500 | 600 | 1 | 5 | — |
| Cell size distribution (peak 2) | μm | 20.0 | — | 0.5 | — | — |
| Thermal insulation performance | mW/mK | 38.0 | 33.0 | 42.0 | 42.0 | 35.0 |

TABLE 5

|  |  |  | Comparative Example 1 | Comparative Example 2 | Comparative Example 3 | Comparative Example 4 | Comparative Example 5 |
|---|---|---|---|---|---|---|---|
| Resin film | Resin(B-1) |  | ○ | ○ | ○ | — | — |
|  | Resin(B-2) |  | ○ | — | — | — | — |
|  | Resin(B-3) |  | ○ | — | — | — | — |
|  | Resin(B-4) |  | — | — | — | — | — |
|  | Resin(B-5) |  | — | — | — | — | — |
|  | Film (C-1) |  | — | — | — | — | ○ |
|  | Film (C-2) |  | — | ○ | — | — | — |
|  | Metal (M-1) |  | Al | Al | — | — | — |
|  | Primer (P-1) |  | — | ○ | — | — | — |
|  | Film thickness | μm | 20 | 20 | 20 | — | 20 |
|  | Lamination number of resin film | Lamination number | 2 | 2 | 1 | — | 1 |
|  | Carbon dioxide gas volume | Volume % | 80 | 80 | 5 | — | 5 |
|  | Carbon dioxide gas permeability | mL/(m$^2$·atm·day) | 0.05 | 0.9 | 12.0 | — | 24.0 |
|  | Water vapor permeability | g/(m$^2$·day) | 1.0 | 1.2 | 35.0 | — | 11.0 |
| Thermal conductivity | Right after production | mW/mK | 32.0 | 30.0 | 40.0 | — | 36.0 |
|  | Aging test (1) | mW/mK | 32.5 | 30.5 | 41.5 | — | 36.0 |
|  | Aging test (2) | mW/mK | 33.0 | 31.0 | 42.0 | — | 36.5 |
| Condensation test | Condensation preventing performance | JISA 1514 | ○ | ○ | x | — | Δ |
|  | Wall condensation preventing test |  | ○ | ○ | x | — | x |

What we claim is:

1. A method of manufacturing a resin foam comprising:
dissolving a blowing agent into a mixture of a resin C and a resin D having a difference of solubility with respect to the blowing agent in an amount of more than 0% and less than 5%;
subjecting the mixture to heat-melting for extrusion; and
evaporating the blowing agent such that the resin foam has a porosity (X) of not less than 80%, a cell (L) with a cell diameter of not less than 1 μm and not more than 1000 μm, and a cell (S) with a cell diameter of not less than 0.01 μm and less than 1 μm, in which two peaks are present in cell diameter distribution, one peak thereof being present in not less than 10 μm and not more than 500 μm and the other peak being present in not less than 0.01 μm and less than 1 μm.

2. The method according to claim 1, wherein a number density of the cell (L) is not less than $10^2$/mm$^2$ and not more than $10^7$/mm$^2$, and a number density of the cell (S) is not less than $10^2$/μm$^2$ and not more than $10^7$ μm$^2$.

3. The method according to claim 1, wherein the blowing agent is carbon dioxide gas.

4. The method according to claim 1, wherein the resin C is polylactic acid resin and the resin D is selected from the group consisting of polyurethane resin, polystyrene resin, polypropylene resin, polyester resin, polyethylene resin, methacrylic resin, polycarbonate resin, and acrylonitrile-butadiene-styrene resin.

5. The method according to claim 1, wherein the resin C is a polylactic acid resin and the resin D is selected from the group consisting of a polylactic acid block copolymer, a polypropylene resin, a methacrylic resin, and an acrylonitrile-butadiene-styrene resin.

6. The method according to claim 1, wherein evaporating the blowing agent occurs only once.

7. The method according to claim 6, wherein a number density of the cell (L) is not less than $10^2$/mm$^2$ and not more than $10^7$/mm$^2$, and a number density of the cell (S) is not less than $10^2$/μm$^2$ and not more than $10^7$/μm$^2$.

8. The method according to claim 6, wherein the blowing agent is carbon dioxide gas.

9. The method according to claim 6, wherein the resin C is polylactic acid resin and the resin D is selected from the group consisting of polyurethane resin, polystyrene resin, polypropylene resin, polyester resin, polyethylene resin, methacrylic resin, polycarbonate resin, and acrylonitrile-butadiene-styrene resin.

10. The method according to claim 6, wherein the resin C is a polylactic acid resin and the resin D is selected from the group consisting of a polylactic acid block copolymer, a polypropylene resin, a methacrylic resin, and an acrylonitrile-butadiene-styrene resin.

* * * * *

UNITED STATES PATENT AND TRADEMARK OFFICE
CERTIFICATE OF CORRECTION

Page 1 of 1

PATENT NO.       : 9,096,728 B2
APPLICATION NO.  : 13/748729
DATED            : August 4, 2015
INVENTOR(S)      : Nakamura et al.

It is certified that error appears in the above-identified patent and that said Letters Patent is hereby corrected as shown below:

In Column 13

At line 10, please change "kg and ks" to -- $\lambda g$ and $\lambda s$ --.

In Column 19

At line 21, please change "$10^6/m^2$" to -- $10^6/\mu m^2$ --.

Signed and Sealed this
First Day of March, 2016

Michelle K. Lee
*Director of the United States Patent and Trademark Office*